United States Patent
Yang et al.

(10) Patent No.: US 8,265,120 B2
(45) Date of Patent: Sep. 11, 2012

(54) PARALLEL SEQUENCE SPREAD SPECTRUM TYPE CHAOTIC SIGNAL TRANSMISSION DEVICE

(75) Inventors: Chang Soo Yang, Gyunggi-do (KR); Hyung Chul Park, Daejeon (KR); Wan Cheol Yang, Gyunggi-do (KR); Sang Yub Lee, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 486 days.

(21) Appl. No.: 12/616,439

(22) Filed: Nov. 11, 2009

(65) Prior Publication Data

US 2010/0142588 A1 Jun. 10, 2010

(30) Foreign Application Priority Data

Dec. 8, 2008 (KR) .................. 10-2008-0124067

(51) Int. Cl.
*H04B 1/69* (2011.01)
(52) U.S. Cl. ................. 375/140; 380/263
(58) Field of Classification Search .............. 375/140; 380/263
See application file for complete search history.

(56) References Cited

U.S. PATENT DOCUMENTS

| | | | |
|---|---|---|---|
| 6,331,974 B1 | 12/2001 | Yang et al. | |
| 6,738,313 B2 | 5/2004 | Fortuna et al. | |
| 2004/0177310 A1* | 9/2004 | Mohan et al. | 714/776 |
| 2006/0072754 A1* | 4/2006 | Hinton et al. | 380/263 |
| 2007/0223700 A1* | 9/2007 | Lee et al. | 380/263 |
| 2007/0230701 A1* | 10/2007 | Park et al. | 380/263 |

FOREIGN PATENT DOCUMENTS

| | | |
|---|---|---|
| KR | 100723222 B1 | 5/2007 |
| KR | 1020070102269 A | 10/2007 |
| KR | 1020080105574 A | 12/2008 |

OTHER PUBLICATIONS

Korean Office Action for Application No. 1020080124067, issued Sep. 17, 2010.

* cited by examiner

*Primary Examiner* — Eva Puente
(74) *Attorney, Agent, or Firm* — Lowe, Hauptman, Ham & Berner, LLP

(57) ABSTRACT

A parallel sequence spread spectrum type chaotic signal transmission device is disclosed to convert a serial data signal into a parallel data signal and transmit a chaotic signal according to the converted data signal. The parallel sequence spread spectrum type chaotic signal transmission device includes: a signal converting unit that converts serial data desired to be transmitted into parallel data having a pre-set unit; a chaotic signal generating unit that generates a pre-set chaotic signal; and an amplifying unit that amplifies the chaotic signal from the chaotic signal generating unit according to the data which has been converted by the signal converting unit.

6 Claims, 3 Drawing Sheets

FIG. 2B $Pas = \Sigma\ Pa1 + Pa2 + Pa3 + Pa4 + Pa5 + Pa6$ $Pbs = \Sigma\ Pb1 + Pb2 + Pb3 + Pb4 + Pb5 + Pb6$

...

$Pns = \Sigma\ Pn1 + Pn2 + Pn3 + Pn4 + Pn5 + Pn6$

FIG. 2C

PARALLEL SEQUENCE SPREAD SPECTRUM TYPE CHAOTIC SIGNAL TRANSMISSION DEVICE

CROSS-REFERENCE TO RELATED APPLICATIONS

This application claims the priority of Korean Patent Application No. 10-2008-0124067 filed on Dec. 8, 2008, in the Korean Intellectual Property Office, the disclosure of which is incorporated herein by reference.

BACKGROUND OF THE INVENTION

1. Field of the Invention

The present invention relates to a chaotic signal transmission device and, more particularly, to a parallel sequence spread spectrum type chaotic signal transmission device adapted for converting a serial data signal into a parallel data signal and transmitting a chaotic signal according to the converted data signal.

2. Description of the Related Art

In general, a chaotic signal is anon-periodical signal that does not have a particular phase and has wideband characteristics. A general sinewave signal has a regular phase over time, which may be distorted or canceled out when an anti-phase interference signal is added thereto. However, in case of the chaotic signal, because it does not have a specific phase, although an anti-phase signal or an interference signal is introduced, no interference occurs, having the advantage that the data signal bearing information can be protected. In addition, in terms of frequency analysis, the chaotic signal has high energy efficiency with a uniform size regardless of the period at a wideband range.

When the chaotic signal is used as a carrier, it has a small spike, so coding such as time hopping is not required in a modem, and a simple transmission device or a reception device can be implemented by using ON-OFF Keying, a simple modulation method.

Because the chaotic signal can be controlled through a small change of system, a communication system with improved power efficiency can be implemented by using the chaotic signal. In addition, because the chaotic signal essentially has a continuous spectrum spreading to a broad frequency band, it can be used for modulation with an energy spectrum without a loss over the wideband. Owing to such advantages of the chaotic signal, there have been many efforts to use the chaotic signal for a transmission device or a reception device using ultra-wide band.

For transmission of the chaotic signal, the related art employs a direct sequence spread spectrum (DSSS). In this method, when multiple users are intended to be supported while maintaining the wideband characteristics, the DSSS has a transmission speed slower than 5 Mbps.

However, recently, entertainment and medical instruments based on a wireless body area network (WEAN) requires a transmission speed of 5 Mbps or faster. Failing to meet such speed requirement, the related art DSSS type chaotic signal transmission device cannot be employed for the WBAN-based entertainment and metical instruments.

SUMMARY OF THE INVENTION

An aspect of the present invention provides a parallel sequence spread spectrum type chaotic signal transmission device capable of converting a serial data signal into a parallel data signal, and transmitting a chaotic signal according to the converted data signal.

According to an aspect of the present invention, there is provided a parallel sequence spread spectrum type chaotic signal transmission device, including: a signal converting unit that converts serial data desired to be transmitted into parallel data having a pre-set unit; a chaotic signal generating unit that generates a pre-set chaotic signal; and an amplifying unit that amplifies the chaotic signal from the chaotic signal generating unit according to the data which has been converted by the signal converting unit.

The signal converting unit may include a serial-parallel converter that converts the serial data into the parallel data comprising chip units each having a pre-set number of bits; and a matrix calculator that converts the parallel data from the serial-parallel converter into a matrix having rows of the respective chips of the data, calculates each data of the matrix, and transfers the calculated data to the amplifying unit.

The matrix calculator may transfer data obtained by adding the data of the rows of the matrix to the amplifying unit.

The amplifying unit may include a programmable gain amplifier that varies a gain according to data from the matrix calculator to amplify the chaotic signal.

The parallel sequence spread spectrum type chaotic signal transmission device may further include: a filter unit that allows the chaotic signal amplified by the amplifying unit to pass at a pre-set frequency band.

The parallel sequence spread spectrum type chaotic signal transmission device may further include: a signal amplifying unit that amplifies the chaotic signal filtered by the filter unit with a pre-set gain.

According to the present invention, a serial data signal is converted into a parallel data signal, and a chaotic signal is transmitted according to the converted data signal, thereby increasing the transmission speed to 5 Mbps or faster.

BRIEF DESCRIPTION OF THE DRAWINGS

The above and other aspects, features and other advantages of the present invention will be more clearly understood from the following detailed description taken in conjunction with the accompanying drawings, in which:

FIGS. 2(a) to 2(c) illustrate a data conversion of the chaotic signal transmission device according to an exemplary embodiment of the present invention.

DETAILED DESCRIPTION OF THE PREFERRED EMBODIMENT

Figure 1:
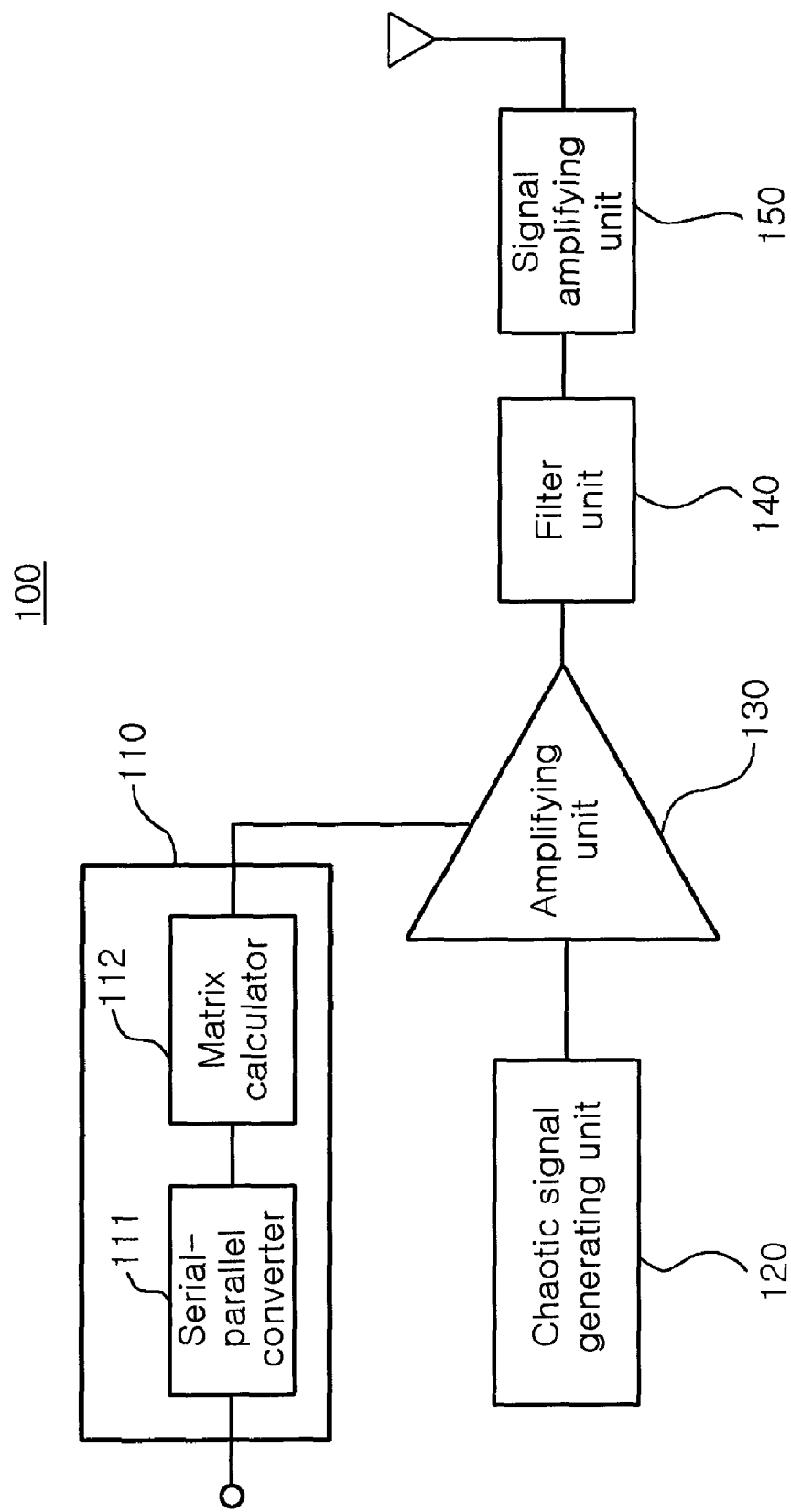
FIG. 1 is a schematic block diagram of a chaotic signal transmission device according to an exemplary embodiment of the present invention.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

FIG. 1 is a schematic block diagram of a chaotic signal transmission device according to an exemplary embodiment of the present invention.

A chaotic signal transmission device 100 according to an exemplary embodiment of the present invention may include a signal converting unit 110, a chaotic signal generating unit 120, and an amplifying unit 130.

The signal converting unit 110 may include a serial-parallel converter 111, and a matrix calculator 112.

A parallel sequence spread spectrum scheme is a scheme for allowing a user to use multiple spread sequences for transmission.

Accordingly, the serial-parallel converter 111 converts serial data desire to be transmitted into parallel data having a pre-set unit. The serial data is data including a continuation of '1' and '0', and the parallel data has a pre-set chip unit, and the chip may refer to a plurality of data. In this case, the parallel data should be quasi-orthogonal.

The matrix calculator 112 converts the parallel data into a matrix, and calculates each data of the converted matrix. The calculated data is transferred to the amplifying unit 130.

Data conversion by the signal converting unit 110 will now be described in detail with reference to the accompanying drawings.

FIGS. 2(a) to 2(c) illustrate a data conversion of the chaotic signal transmission device according to an exemplary embodiment of the present invention.

With reference to FIG. 2(a), the serial data to be transmitted may be divided by chips each having a pre-set number of bits, namely, into the first to nth chips, and the serial-parallel converter 111 converts the serial data into parallel data having pre-set chip units. In the drawing, a single chip includes six bits.

With reference to FIG. 2(b), the matrix calculator 112 converts the parallel data into a matrix, and the matrix includes the same number of rows as the number of bits of the chips. Namely, the first chip of the parallel data forms a first row of the matrix, and in the same manner, the nth chip of the parallel data forms the nth row of the matrix.

Next, the matrix calculator 1112 calculates each data of the matrix. Namely, as shown in FIG. 2(c), the matrix calculator 112 adds data of the respective rows and transfers the added data (Pas, Pbs, . . . , Pns) to the amplifying unit 130.

The chaotic signal generating unit 120 generates a pre-set chaotic signal and transfers the generated chaotic signal to the amplifying unit 130.

The amplifying unit 130 amplifies the chaotic signal transferred from the chaotic signal generating unit 120 according to the added data from the matrix calculator 112 of the signal converting unit 110. Accordingly, the amplifying unit 130 may include a programmable gain amplifier (PGA) for varying a gain according to the added data. The PGA varies a gain according to the added data, and the gain may be determined according to the number of bits of the chips of the parallel data of the signal converting unit 110.

The amplifying unit 130 may not have a plurality of switches for switching the chaotic signal according to the bits of the data and provided according to the number of bits of the data, so the circuit area and costs can be reduced.

Figure 3:
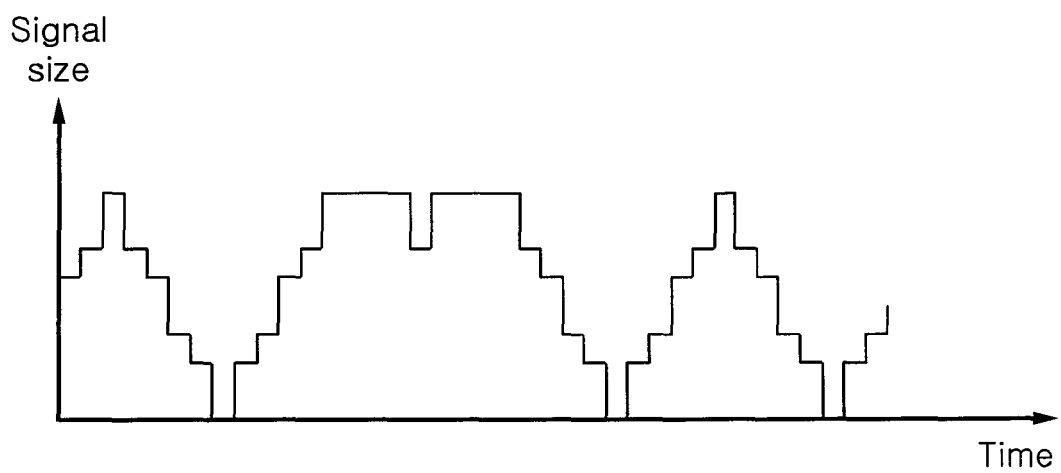
FIG. 3 is a graph of a signal waveform outputted from the chaotic signal transmission device according to an exemplary embodiment of the present invention.

FIG. 3 is a graph of a signal waveform outputted from the chaotic signal transmission device according to an exemplary embodiment of the present invention.

With reference to FIGS. 1 to 3, the output signal of the amplifying unit 130 of the chaotic signal transmission device 100 may be formed as a parallel sequence spread spectrum as shown in FIG. 3.

The chaotic signal transmission device 100 may further include a filter unit 140 and a signal amplifying unit 150.

The filter unit 140 allows the output signal from the amplifying unit 130 to pass at a pre-set frequency band, and the passing output signal may be deformed to an analog form in its external form.

The signal amplifying unit 150 amplifies the signal which has been filtered by the filter unit 140 suitably for transmission, and transmits the amplified signal to the exterior.

As set forth above, in the chaotic signal transmission device according to exemplary embodiments of the invention, because the serial transmission data is converted into parallel data, and the chaotic signal is modulated according to the converted parallel transmission data so as to be transmitted, the transmission speed can be improved compared with the direct spread sequence spectrum method.

While the present invention has been shown and described in connection with the exemplary embodiments, it will be apparent to those skilled in the art that modifications and variations can be made without departing from the spirit and scope of the invention as defined by the appended claims.

What is claimed is:

1. A parallel sequence spread spectrum type chaotic signal transmission device, comprising:
   a signal converting unit that converts serial data desired to be transmitted into parallel data having a pre-set unit;
   a chaotic signal generating unit that generates a pre-set chaotic signal; and
   an amplifying unit that amplifies the chaotic signal from the chaotic signal generating unit according to the data which has been converted by the signal converting unit.

2. The device of claim 1, wherein the signal converting unit comprises:
   a serial-parallel converter that converts the serial data into the parallel data comprising chip units each having a pre-set number of bits; and
   a matrix calculator that converts the parallel data from the serial-parallel converter into a matrix having rows of the respective chips of the data, calculates each data of the matrix, and transfers the calculated data to the amplifying unit.

3. The device of claim 2, wherein the matrix calculator transfers data obtained by adding the data of the rows of the matrix to the amplifying unit.

4. The device of claim 3, wherein the amplifying unit comprises a programmable gain amplifier that varies a gain according to data from the matrix calculator to amplify the chaotic signal.

5. The device of claim 1, further comprising:
   a filter unit that allows the chaotic signal amplified by the amplifying unit to pass at a pre-set frequency band.

6. The device of claim 5, further comprising:
   a signal amplifying unit that amplifies the chaotic signal filtered by the filter unit with a pre-set gain.

* * * * *